Figure 1:
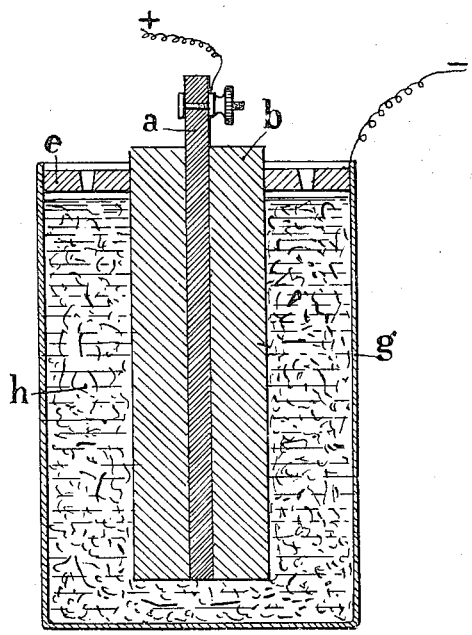

Nov. 9, 1926. 1,606,326

E. A. G. STREET

ELECTRIC CELL

Original Filed August 9, 1921

Inventor
E. A. G. Street desc'd.
J. A. Street
admtrix.
By Marks Clerk

Patented Nov. 9, 1926.

1,606,326

UNITED STATES PATENT OFFICE.

ERNEST AUGUSTE GEORGE STREET, DECEASED, LATE OF PARIS, FRANCE; BY JANETTA AMELIA STREET, BORN RITCHIE, OF PARIS, FRANCE, ADMINISTRATRIX; SAID ERNEST AUGUSTE GEORGE STREET ASSIGNOR TO SOCIÉTÉ ANONYME LE CARBONE, OF LEVALLOIS-PERRET, FRANCE.

ELECTRIC CELL.

Original application filed August 9, 1921, Serial No. 490,966, and in France June 3, 1921. Divided and this application filed July 23, 1924. Serial No. 727,848.

The present invention which is a divisional application of the patent application filed on the 9th August, 1921, Serial No. 490,966, patented July 14, 1925, 1,545,801, relates to an electric dry cell which does not contain any depolarizing substance and in which the depolarizing is produced by the action of the surrounding atmosphere.

The invention relates to a special construction of the positive electrode which is designed in such a manner as to give simultaneously the following results:—

(a) Electric conductivity;
(b) Porosity for gases;
(c) An easy access for the depolarizing air or gases into the mass of the electrode;
(d) The maintenance of the latter in a state of dryness, as complete as possible.

This invention is essentially characterized by the two following main points:—

1.—The application of a conductive porous mass upon the positive electrode, the upper part of the said mass projecting above the electrolyte into the surrounding atmosphere. This porous mass consists, for instance, of charcoal and has for its effect to permit an active circulation of the gases which are due to the working of the cell and of those which are produced by the surrounding medium used as depolarizers.

2.—The immersion of the positive electrode surrounded by this porous mass, in a gelatinous material, similar to that used as immobilizing agent in ordinary dry cells, and adapted to be impregnated with the electrolytic liquid.

This combination has for effect to produce the following result:

Owing to the small degree of permeability of the gelatinous material, the afflux of the electrolyte, which impregnates the latter, to the porous mass is sufficiently reduced so that the small quantity of electrolyte which reaches this porous mass is evaporated by the air contained in the latter. Besides, owing to its absorbing properties, the porous mass removes from the portion of the gelatinous material with which it is in contact, the greater part of the noncombined water it contains; this portion thus dehydrated of the gelatinous material forms a film which prevents the penetration of the electrolyte in the porous mass applied on the positive electrode, and simply absorbs the quantity of electrolyte necessary for the production of the current, whilst allowing the passage of the gases produced by the reaction of the cell.

In these conditions, the porous mass applied on the positive electode, is held in a state of dryness as complete as possible and maintains its power of absorption.

In the accompanying drawing illustrating, by way of example, in vertical section a dry cell or with fixed liquid in accordance with the present invention, Fig. 1 is a vertical section of the cell.

Figure 2:
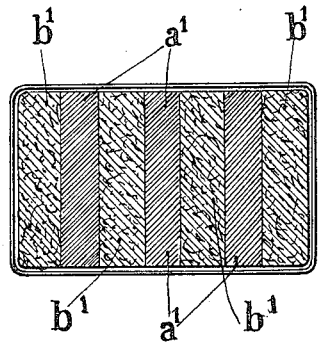

Fig. 2 shows, in vertical section, another form of construction of the positive electrode.

In the form of construction illustrated in Fig. 1, the positive electrode is constituted by a central carbon stick $a$ on which is mounted an agglomerate of charcoal $b$; this charcoal is agglomerated under high pressure and baked at a temperature which is sufficiently high for eliminating the hydrocarbons contained in the agglomerating substance and for imparting a sufficient porosity and a high electric conductivity to the product.

The said agglomerate of charcoal may receive any suitable shape, such as cylindrical, parallelepipedic, winged, etc.

This electrode $a$, surrounded by its porous mass $b$, is inserted in a gelatinous material $h$ impregnated with electrolyte and contained in a zinc vessel $g$, constituting the negative electrode; this vessel is closed at its upper part by a layer $e$ of colophany, wax, etc.

The gelatinous material $h$ is constituted, for instance, by a jelly similar to that used as immobilizing agent in ordinary dry cells, or by any other material capable of fulfilling the same function.

The carbon stick $a$ and the porous mass $b$ emerge above the vessel $g$ of the cell so as to be directly in contact with the air or gas of the surrounding medium used as depolarizer.

In such a cell, the porous mass $b$, always maintained to a degree of dryness as perfect as possible permits a free circulation of the gases; consequently the hydrogen and ammoniacal gas which, in the case under consideration, are produced during the operation of the cell, are absorbed progressively by the porous mass $b$; in these conditions, the depolarization takes place in a continuous manner.

In the kind of cell according to the present invention, the charcoal forming the porous mass instead of being agglomerated could be simply pressed around the charcoal $a$ and enclosed in a cloth sack, for instance; the charcoal will be mixed or not with more conductive substances such as plumbago.

With the object of effecting a complete distribution of the porous mass, and of obtaining a more rapid depolarization, the positive electrode can be formed of several ordinary charcoal blades $a^1$ alternating with porous blades of charcoal $b^1$. The said ordinary blades of charcoal and the said porous blades being strongly pressed against each other by any other suitable means.

It is to be understood that the arrangement of a cell according to the present invention can be constructed in any form and of any size.

Claims:—

1. An electric dry cell comprising a negative electrode of zinc forming the container, a central positive electrode of carbon, a highly absorbent porous compound applied on the central carbon electrode and protruding into the atmosphere whereby said porous mass absorbs atmospheric air and the gases which are produced during the reaction in the cell, an immobilizing gelatinous material impregnated with the electrolyte, said gelatinous material filling the space between the porous absorbing compound and the zinc electrode, a film enveloping the porous compound and formed by the pectization of the portion of the gelatinous material in contact with said porous compound by absorption of the part of the latter of a small quantity of non-combined water surrounding the portion of the gelatinous material in contact with the porous compound.

2. An electric dry cell comprising a negative electrode forming a container, a positive electrode composed of a plurality of carbon laminæ and of laminæ constituted by a compounded porous conductor interposed between the laminæ of ordinary carbon and applied on the external face of said outer laminæ, means for maintaining all said laminæ one against the other, an immobilizing gelatinous material impregnated with the electrolyte, said gelatinous material filling all the space contained between said positive electrode and negative zinc electrode, a film formed by the pectization of this gelatinous material in contact with the laminæ of the porous conducting compound by the absorption of these latter of a small quantity of non-combined water enclosing the portion of the gelatinous material in contact with the porous laminæ.

The foregoing specification of my "Improvements in and relating to electric cells", signed by me this 8th day of July 1924.

JANETTA AMELIA STREET, born RITCHIE,
*Administratrix of Ernest A. G. Street.*